US012338046B2

(12) United States Patent
Thompson

(10) Patent No.: US 12,338,046 B2
(45) Date of Patent: Jun. 24, 2025

(54) ADJUSTABLE SEAL

(71) Applicant: Caterpillar Inc., Peoria, IL (US)

(72) Inventor: Mark W. Thompson, Manhattan, KS (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 18/295,593

(22) Filed: Apr. 4, 2023

(65) Prior Publication Data

US 2024/0336413 A1 Oct. 10, 2024

(51) Int. Cl.
*B65D 63/10* (2006.01)

(52) U.S. Cl.
CPC .... *B65D 63/1063* (2013.01); *B65D 2563/101* (2013.01)

(58) Field of Classification Search
CPC .......... B65D 63/1063; B65D 2563/101; B65D 2563/107; F16J 3/042; F16J 15/061; F16J 15/022
See application file for complete search history.

(56) References Cited

U.S. PATENT DOCUMENTS

| 4,964,401 | A | 10/1990 | Taigen |
| 6,343,408 | B1 | 2/2002 | Neugebauer |
| 6,497,014 | B2 | 12/2002 | Neugebauer |
| 9,171,486 | B1 | 10/2015 | Anderton et al. |
| 10,065,777 | B2 | 9/2018 | King |
| 10,336,519 | B2 | 7/2019 | King |
| D874,293 | S | 2/2020 | King |
| 10,689,173 | B2 | 6/2020 | King |
| D912,503 | S | 3/2021 | King |
| 11,235,916 | B2 * | 2/2022 | King .................. B65D 63/1072 |
| 11,286,093 | B2 | 3/2022 | King |
| 11,352,791 | B1 | 6/2022 | Nicholls |
| 11,702,260 | B1 * | 7/2023 | King .................. B65D 63/1027 |
| | | | 24/16 PB |
| 2006/0162130 | A1 | 7/2006 | Cook |
| 2010/0236030 | A1 * | 9/2010 | Dyer ..................... B65D 63/10 |
| | | | 24/16 PB |

(Continued)

FOREIGN PATENT DOCUMENTS

| CN | 102018334 A | 4/2011 |
| EP | 2706274 | 3/2014 |

(Continued)

OTHER PUBLICATIONS

Written Opinion and International Search Report for Int'l. Patent Appln. No. PCT/US2024/013910, mailed Jul. 4, 2024 (15 pgs).

*Primary Examiner* — David M Upchurch

(57) ABSTRACT

In some implementations, an adjustable seal includes a multi-layer strap having a first end and a second end. A first layer of the multi-layer strap comprises a non-sealing material. A second layer of the multi-layer strap comprises a sealing material. The first end of the multi-layer strap includes a locking mechanism on the first layer of the multi-layer strap. The second end of the multi-layer strap is configured to be inserted through an opening of the locking mechanism to cause the multi-layer strap to form a loop that is to provide a seal. The first layer of the multi-layer strap is to form an external layer of the loop and the second layer of the multi-layer strap is to form an internal layer of the loop.

20 Claims, 16 Drawing Sheets

(56) References Cited

U.S. PATENT DOCUMENTS

| | | | |
|---|---|---|---|
| 2014/0082923 A1* | 3/2014 | Owen | F16L 3/137 |
| | | | 29/525.08 |
| 2016/0214776 A1* | 7/2016 | King | B65D 63/1072 |
| 2017/0236461 A1 | 8/2017 | Sullivan et al. | |
| 2021/0048050 A1* | 2/2021 | Coey | F16M 13/022 |

FOREIGN PATENT DOCUMENTS

| | | | |
|---|---|---|---|
| EP | 3265708 B1 | 11/2020 | |
| JP | 1620623 S | 12/2018 | |
| WO | 2019089663 A1 | 5/2019 | |

* cited by examiner

ADJUSTABLE SEAL

TECHNICAL FIELD

The present disclosure relates generally to a seal and, for example, to an adjustable seal.

BACKGROUND

An O-ring seal is a ring-shaped seal that can be used to seal a fluid or gas (e.g., between two surfaces). In some cases, an O-ring seal can be placed at a desired position, such as a joint between components of a machine, when assembling the components. Exemplary machines include, dump trucks, trains, mining vehicles, and other vehicles. However, the O-ring seal degrades over time (e.g., due to environmental conditions of a worksite at which the machine is operating), and is subject to damage or breakage due to operation of the machine (e.g., debris at the worksite may contact and break the O-ring seal). Because O-ring seals are formed of a continuous sealing material, in many cases, a degraded, damaged, or broken O-ring seal cannot be replaced with a new O-ring seal without disassembling the one or more components, placing the new O-ring seal at the desired position, and reassembling the one or more components. This is a time-intensive and complex process that risks damage to the one or more components (e.g., due to incorrect disassembly and/or reassembly of the one or more components). Consequently, a degraded, damaged, or broken O-ring seal is often not replaced until the one or more components are to be serviced for another reason. This too can result in damage to the one or more components.

U.S. Pat. No. 10,689,173 (the '173 patent) discloses an elastomer lined self-locking tie that avoids damage to objects collected by the self-locking tie and securely encompasses such objects. Notably, however, the '173 patent does not disclose that the self-locking tie is able to provide a sealing functionality.

The adjustable seal of the present disclosure solves one or more of the problems set forth above and/or other problems in the art.

SUMMARY

An adjustable seal comprising: a multi-layer strap having a first end and a second end, wherein: a first layer of the multi-layer strap comprises a non-sealing material; a second layer of the multi-layer strap comprises a sealing material; the first end of the multi-layer strap includes a locking mechanism on the first layer of the multi-layer strap; and the second end of the multi-layer strap is configured to be inserted through an opening of the locking mechanism to cause the multi-layer strap to form a loop that is to provide a seal, wherein the first layer of the multi-layer strap is to form an external layer of the loop and the second layer of the multi-layer strap is to form an internal layer of the loop.

An adjustable seal comprising: a strap having a first end and a second end, wherein: a first layer of the strap comprises a non-sealing material; a second layer of the strap comprises a sealing material; the first end of the strap includes a locking mechanism on the first layer of the strap; and the second end of the strap is configured to be inserted through an opening of the locking mechanism to cause the strap to form a loop that is to provide a seal.

An adjustable seal comprising: a strap having a first end and a second end, wherein: a first layer of the strap comprises a non-sealing material; a second layer of the strap comprises a sealing material; the first end of the strap includes a locking mechanism; and the second end of the strap is configured to be inserted through an opening of the locking mechanism to form a loop that is to provide a seal.

DETAILED DESCRIPTION

This disclosure relates to an adjustable seal, which is applicable to any machine that requires a seal (e.g., to seal a joint of the machine). For example, the machine may be a construction machine, a marine vessel, an automobile, a transportation vehicle, or another type of machine.

Figure 1A:
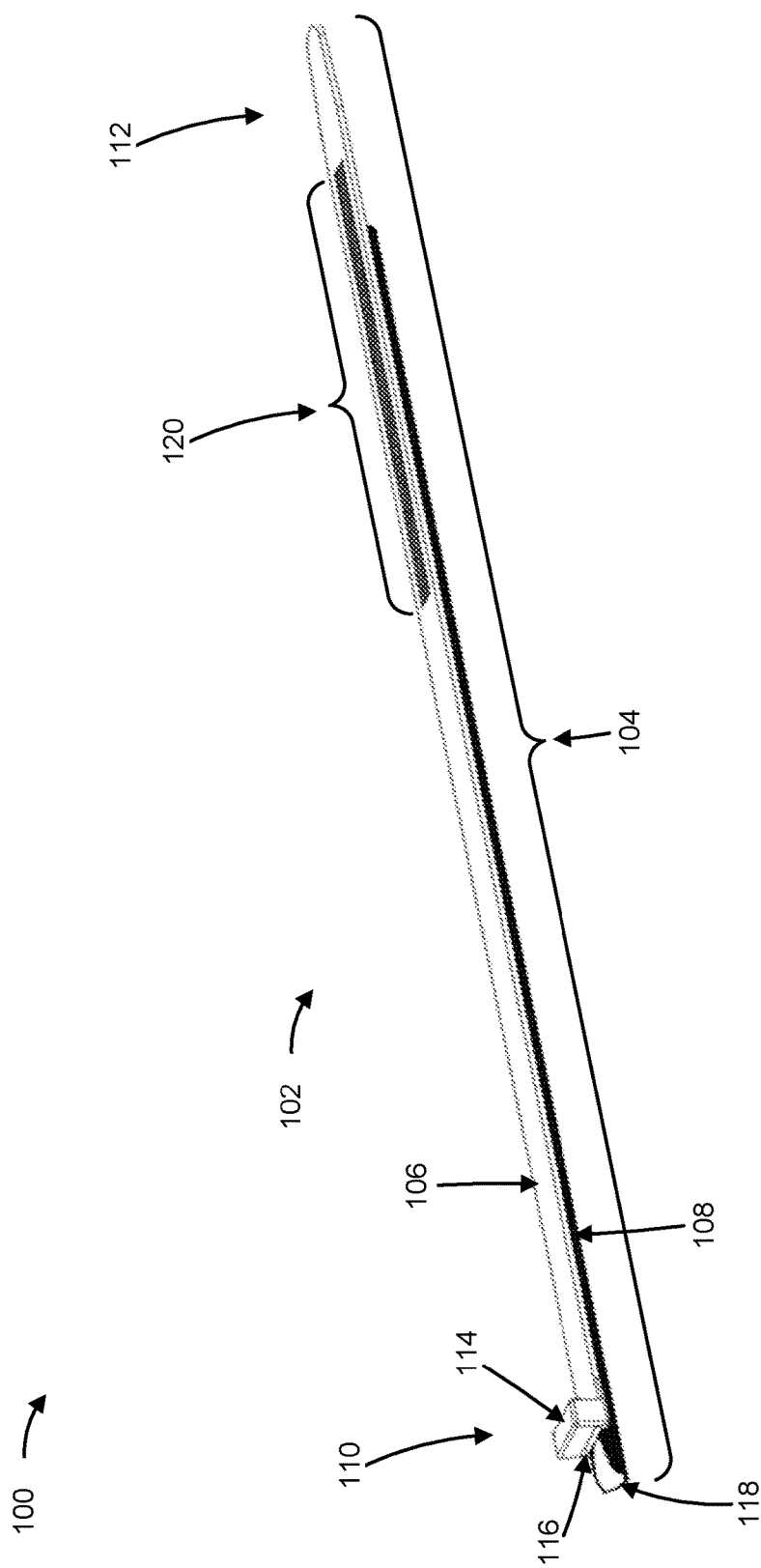
FIGS. 1A-1D are diagrams of an example implementation of an adjustable seal.
Figure 1B:
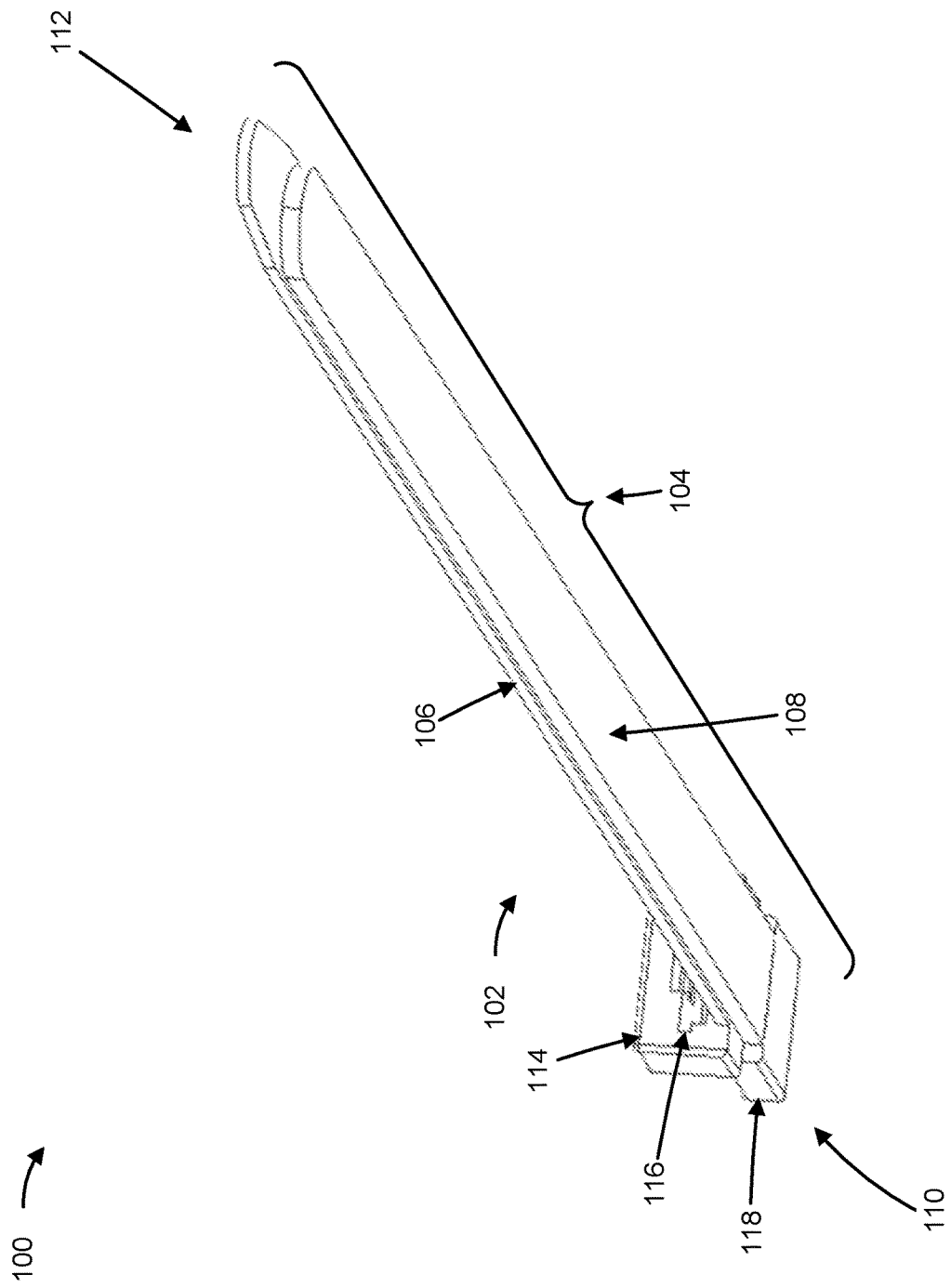
Figure 1C:
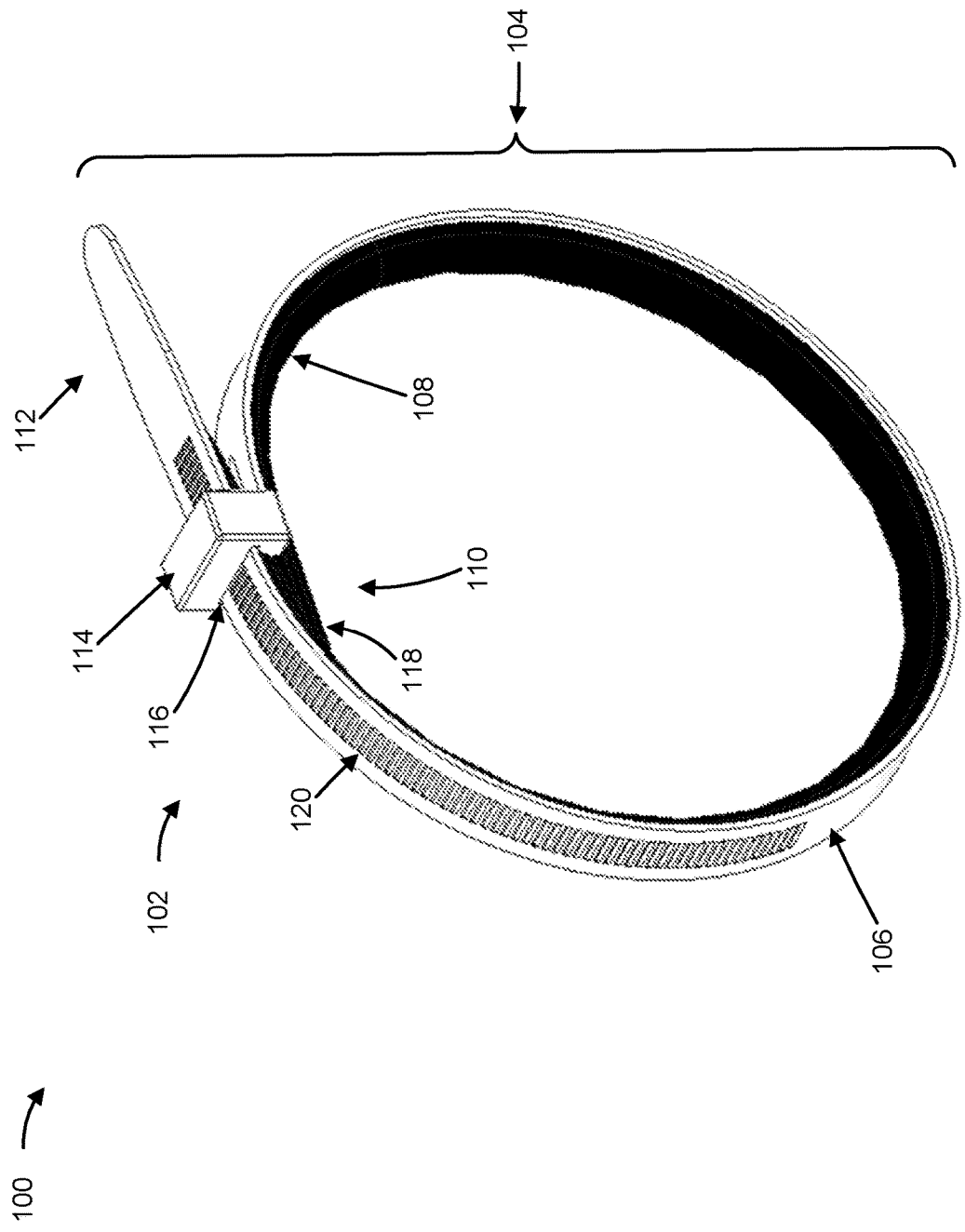
Figure 1D:
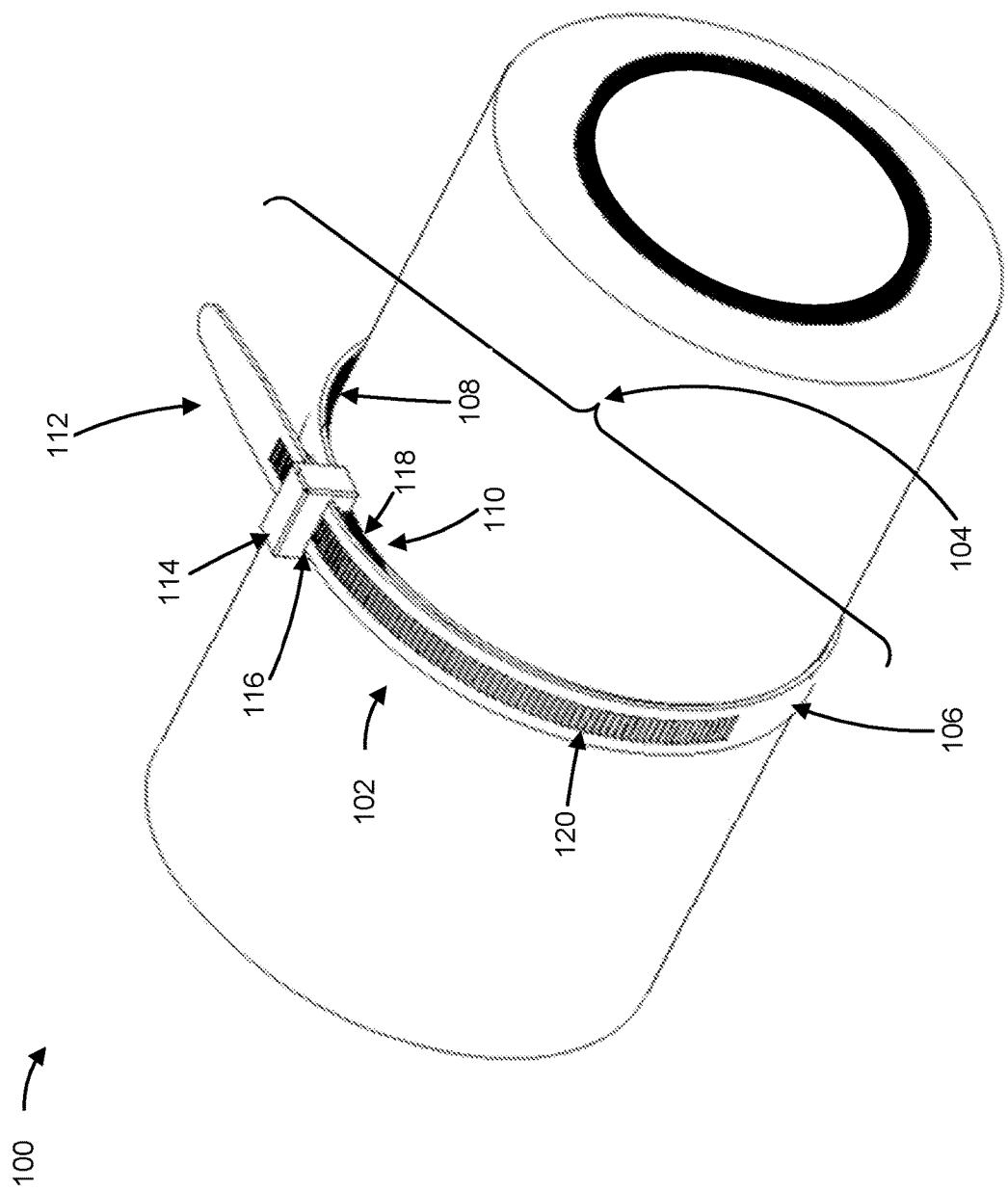

FIGS. 1A-1D are diagrams of an example implementation 100 of an adjustable seal 102. The adjustable seal 102 may comprise a strap 104 (e.g., a multi-layer strap) that includes a first layer 106 and a second layer 108, and that has a first end 110 and a second end 112. FIG. 1A shows an angled side-view of the adjustable seal 102, FIG. 1B shows an angled bottom view of the adjustable seal 102, FIG. 1C shows an angled side-view of the adjustable seal 102 when it is formed into a loop (e.g., that is provide a seal), and FIG. 1D shows an angled side-view of the adjustable seal 102 when it is formed into a loop around an object (e.g., to provide a seal around the object).

The first layer 106 may comprise a non-sealing material. The non-sealing material may include, for example, at least one of nylon, polypropylene, polyester, or metal. The second layer 108 may comprise a sealing material. The sealing material may include, for example, at least one of natural rubber, silicone rubber, neoprene rubber, nitrile rubber, fluorocarbon rubber, or polyurethane. As shown in FIGS. 1A-1D, the first layer 106 of the strap 104 may be disposed on the second layer 108 of the strap 104 (e.g., in a stack formation, where the first layer 106 is on top of the second layer 108). The first layer 106 may be directly disposed on the second layer 108, or, alternatively, one or more other layers may be disposed between the first layer 106 and the second layer 108. In some implementations, the first layer 106 may be affixed to the second layer 108 by an adhesive, an adhesive tape, an adhesive film, and/or some other material. The first layer 106 may be configured to form an external layer of a loop formed by the strap 104, and the second layer 108 may be configured to form an internal layer of the loop, as further described herein.

Each of the first layer 106 and the second layer 108 may have a particular cross-section (e.g., as viewed from the first end 110 or the second end 112 of the strap 104), such as a circular cross-section, an oval cross-section, a rectangular cross-section, and/or a polygonal cross-section. For example, the first layer 106 and the second layer 108 may each have a same-shaped cross-section, such as a rectangular cross-section. As another example, the first layer 106 may have a cross-section, such as a polygonal cross-section, that is different than a cross-section, such as an oval cross-section, of the second layer 108.

As shown in FIGS. 1A-1B, the strap 104 may extend in a "lengthwise" direction from the first end 110 to the second end 112 (e.g., when the strap 104 is not formed into a loop, such as when the strap 104 lays on a flat surface). The first end 110 may include a locking mechanism 114 (e.g., that includes an opening 116) and a lip 118.

The locking mechanism 114 may be formed on the first layer 106 (e.g., at the first end 110) of the strap 104. For example, the locking mechanism 114 may be disposed on the first layer 106 (e.g., on top of the first layer 106), or may be an integrated component of the first layer 106. Accordingly, the locking mechanism 114 may comprise a non-sealing material (e.g., the same non-sealing material of the first layer 106, or, alternatively, a different non-sealing material). The locking mechanism 114 may include the opening 116, which may be configured to receive the second end 112 of the strap 104. Accordingly, the second end 112 may be configured to be inserted through the opening 116 of the locking mechanism 114.

Accordingly, when the second end 112 is inserted through the opening 116 of the locking mechanism 114, the strap 104 may form a loop. For example, as shown in FIGS. 1C-1D, the second end 112 may be inserted through the opening 116 (and therefore extend out from the opening 116), which may cause the strap 104 to form a loop. When the strap 104 is formed into the loop, the first layer 106 forms an external layer of the loop and the second layer 108 forms an internal layer of the loop. As shown in FIG. 1D, the internal layer (e.g., formed of the second layer 108) of the loop may be configured to surround an object. In this way, the strap 104 (e.g., when formed into a loop) may be configured to provide a seal (e.g., for sealing a fluid and/or gas) around the object (e.g., when the loop is sufficiently tightened to apply a sealing force on the object). Additionally, the locking mechanism 114 may be configured to prevent loosening of the loop (e.g., when the second end 112 is inserted through the opening 116 of the locking mechanism 114), as further described herein, which may facilitate the strap 104 providing a seal when formed in the loop (e.g., by maintaining a sealing force).

As further shown in FIGS. 1A-1D, the second end 112 may have a geometry that is angled, tapered, or otherwise shaped to facilitate insertion of the second end 112 through the opening 116 of the locking mechanism 114. Additionally, or alternatively, a portion of the second end 112 may include only the first layer 106 (e.g., may not include the second layer 108). This may reduce a thickness of the portion of the second end 112, which may facilitate insertion of the second end 112 through the opening 116 of the locking mechanism 114.

The lip 118 may be positioned at the opening 116 of the locking mechanism 114 (e.g., at the first end 110 of the strap 104). For example, as shown in FIGS. 1A-1D, the lip 118 may be positioned on an input side of the opening 116 of the locking mechanism 114. The lip 118 may comprise a sealing material (e.g., the same sealing material of the second layer 108, or, alternatively, a different sealing material) and may be configured to facilitate insertion of the second end 112 through the opening 116 of the locking mechanism 114. For example, the lip 118 may have a geometry that is angled, tapered, or otherwise shaped to facilitate insertion of the second end 112 through the opening 116. Accordingly, the lip 118 may act as ramp that allows the second end 112 to insert through the opening 116. Further, the lip 118 may be configured to contact a portion of the second layer 108 of the strap 104 when the second end 112 is inserted through the opening 116 to form a loop, such as shown in FIGS. 1C-1D. Accordingly, because the lip 118 and the second layer 108 each comprise a sealing material, the lip 118 contacting the portion of the second layer 108 allows for the strap 104 to provide a seal around an object, such as shown in FIG. 1D (e.g., when the loop formed by the strap 104 is sufficiently tightened to apply a sealing force on the object).

As further shown in FIGS. 1A-1D, the first layer 106 of the strap 104 may include one or more engagement components 120. For example, the one or more engagement components 120 may be formed on, or an integrated component of, a portion of a surface (e.g., a top, or external, surface) of the first layer 106. The one or more engagement components 120 may include one or more teeth, or other similar components, that are configured to engage with a locking component (e.g., a locking component 202, as further described herein) of the locking mechanism 114. As shown in FIGS. 1C-1D, the one or more engagement components 120 may be positioned on the first layer 106 such that at least one engagement component 120, of the one or more engagement components 120, is disposed within the opening 116 when the second end of the strap 104 is inserted through the opening 116 to form a loop. This may allow the locking component of the locking mechanism 114 of the locking mechanism 114 to engage with the at least one engagement component 120, which may prevent loosening of the loop (and thereby facilitate the loop providing a seal).

As indicated above, FIGS. 1A-1D are provided as an example. Other examples may differ from what is described in connection with FIGS. 1A-1D.

Figure 2A:
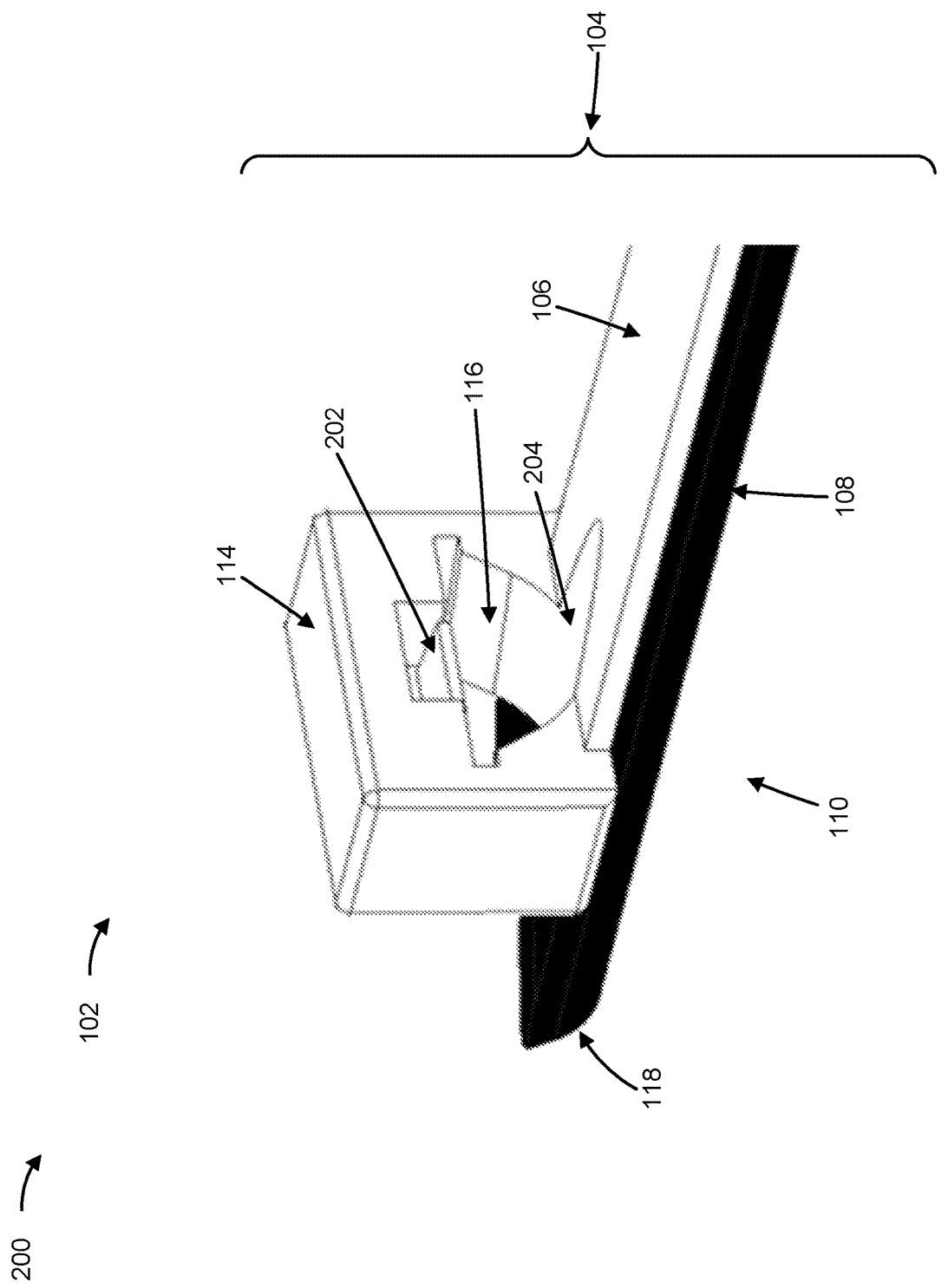
FIGS. 2A-2D are diagrams of an example implementation related to a locking mechanism of the adjustable seal.
Figure 2B:
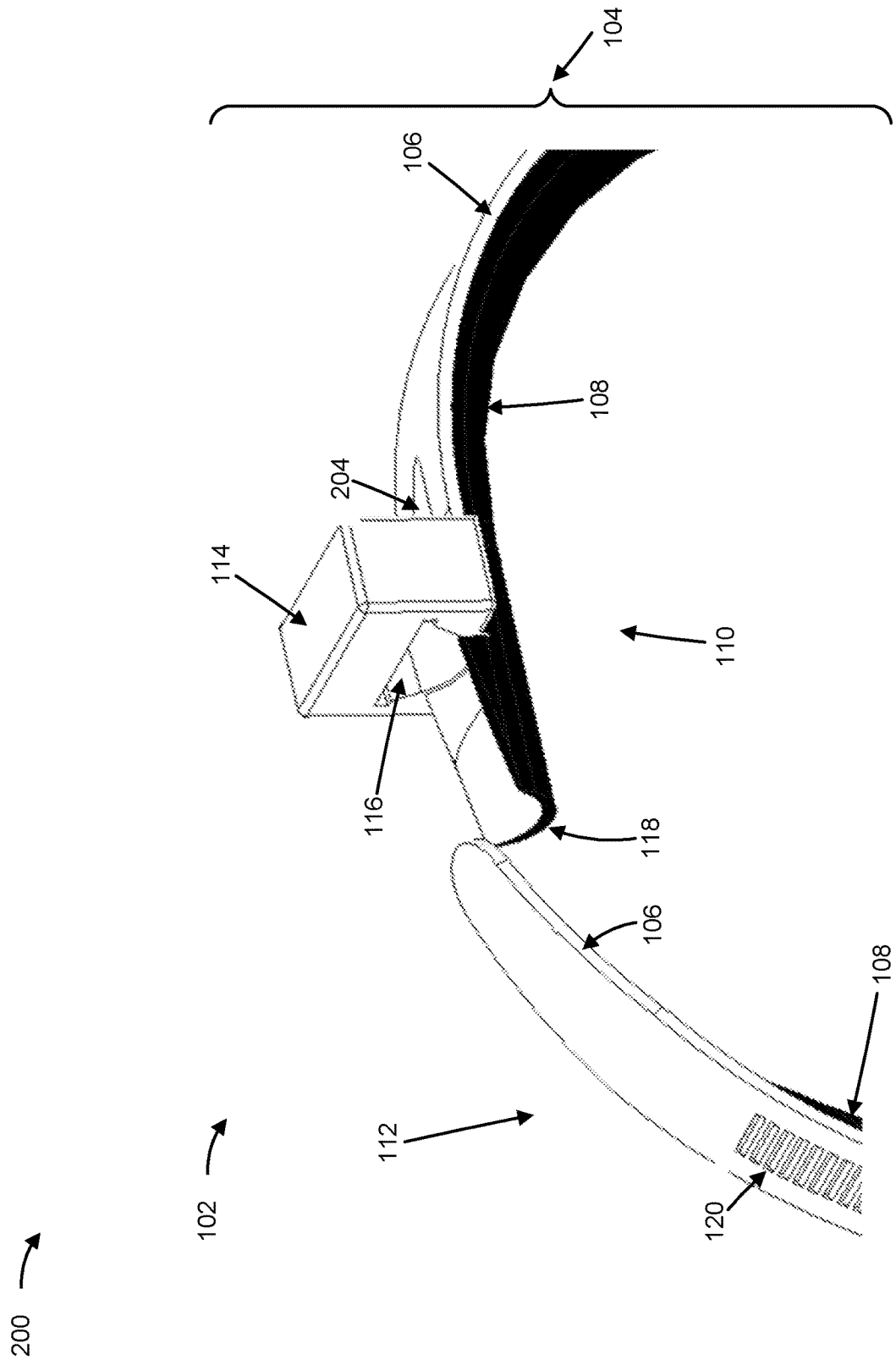
Figure 2C:
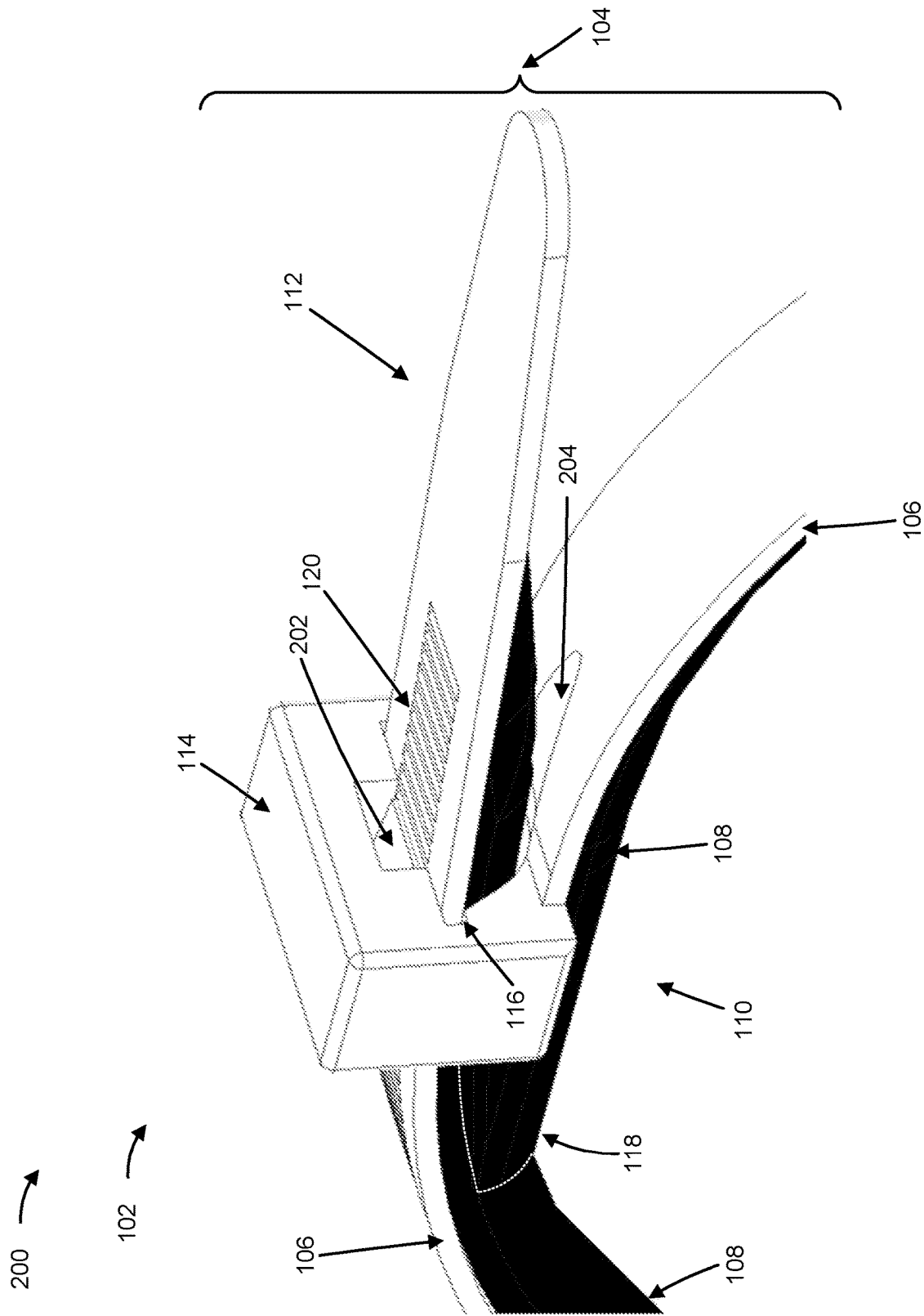
Figure 2D:
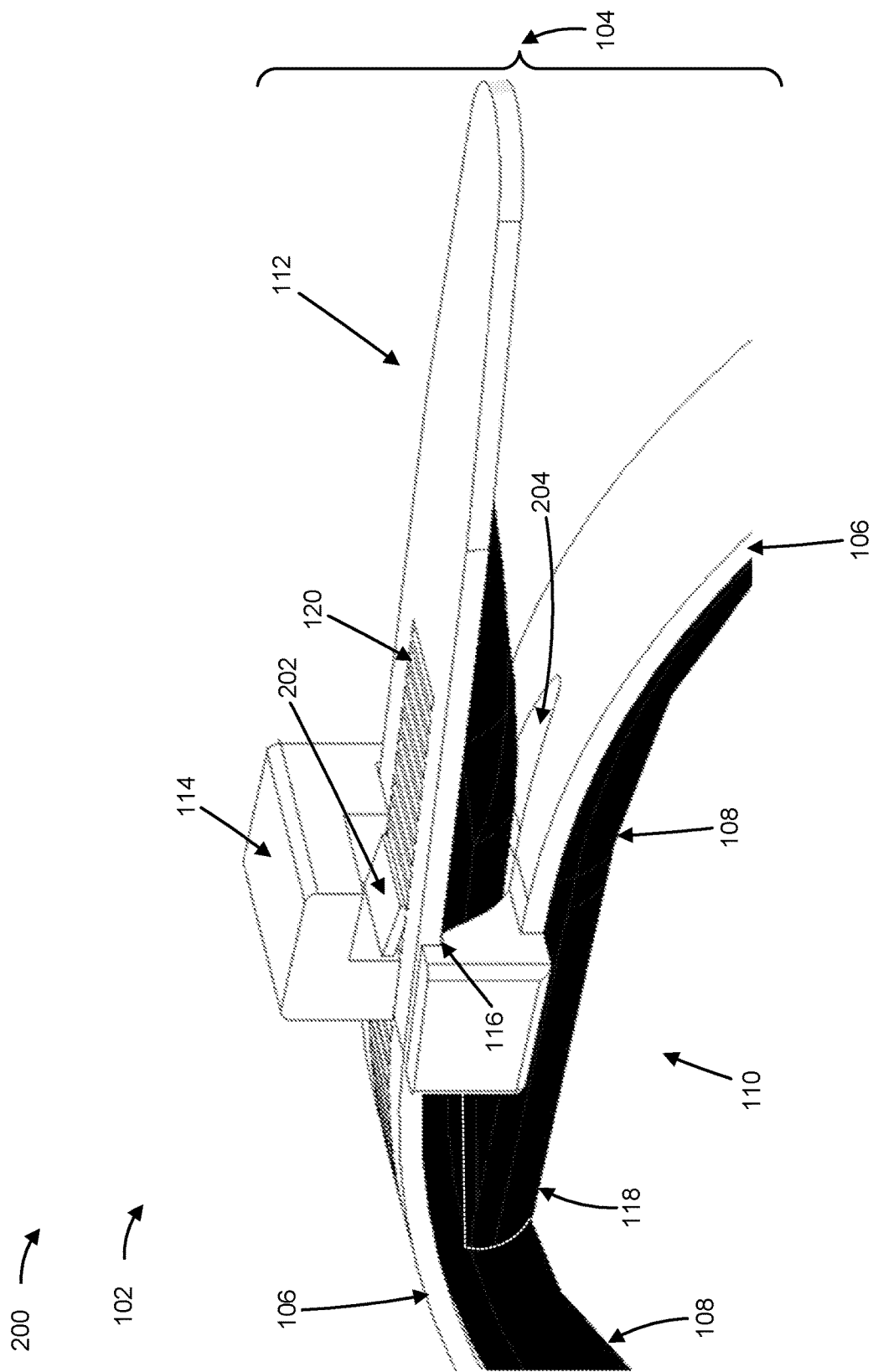

FIGS. 2A-2D are diagrams of an example implementation 200 related to the locking mechanism 114 of the adjustable seal 102 (e.g., at the first end 110 of the strap 104). FIG. 2A shows an angled side-view of the locking mechanism 114 at the first end 110 of the strap 104, FIG. 2B shows an angled side-view of the first end 110 of the strap 104 in association with inserting the second end 112 through the opening 116 of the locking mechanism 114, FIG. 2C shows an angled side-view of the second end 112 of the strap 104 inserted through the opening 116 of the locking mechanism 114, and FIG. 2D shows an angled side-view of the second end 112 of the strap 104 inserted through the opening 116 of the locking mechanism 114, where a portion of the locking mechanism 114 is cut away.

As shown in FIGS. 2A-2D the locking mechanism 114 may include a locking component 202 and/or a valley 204. The locking component 202 may include a pawl component, or other locking component, that is configured to secure a portion of the second end 112 of the strap 104 within the opening 116 of the locking mechanism 114 (e.g., when the second end 112 is inserted through the opening 116 of the locking mechanism 114). For example, the locking component 202 may be configured to engage with at least one engagement component 120, of the one or more engagement components 120, when the second end 112 is inserted through the opening 116 (e.g., to form a loop, such as to provide a seal). In this way, the locking mechanism 114 (and/or the locking component 202) may be configured to prevent loosening of the loop.

As further shown in FIGS. 2A-2D, the opening 116 of the locking mechanism 114 may be aligned with the first layer 106 of the strap 104 at the opening 116 of the locking mechanism 114. That is, an insertion axis of the opening 116 may be parallel to a tangent line, within a tolerance (e.g., that is less than or equal to 1 degree, 2 degrees, or 3 degrees, among other examples), of the first layer 106 at the opening 116. In this way, when the second end 112 of the strap 104 is inserted through the opening 116 of the locking mechanism 114 (e.g., to form a loop), a portion of the second layer 108 that is within the opening 116 may be aligned with the insertion axis of the opening 116 and/or the first layer 106 at the opening 116. This may facilitate a sealing material (e.g., provided by the second layer 108 and/or the lip 118) being provided on an internal surface of the loop (e.g., on an entirety, or near entirety, of the internal surface of the loop), which may facilitate the strap 104 providing a seal.

As additionally shown in FIGS. 2A-2D, the opening 116 of the locking mechanism 114 may have a cross-section that matches a cross-section of the second end 112 of the strap 104. For example, an upper portion of the cross-section of the opening 116 may match a cross-section of the first layer 106 of the strap 104, and a lower portion of the cross-section of the opening 116 may match a cross-section of the second layer 108 of the strap 104. Further, the locking mechanism 114 may include the valley 204 (e.g., that may extend into a portion of the first layer 106 at an output side of the of the opening 116), which may facilitate insertion of the second layer 108 of the second end 112 of the strap 104 as the second end 112 is inserted through the opening 116.

As indicated above, FIGS. 2A-2D are provided as an example. Other examples may differ from what is described in connection with FIGS. 2A-2D.

Figure 3A:
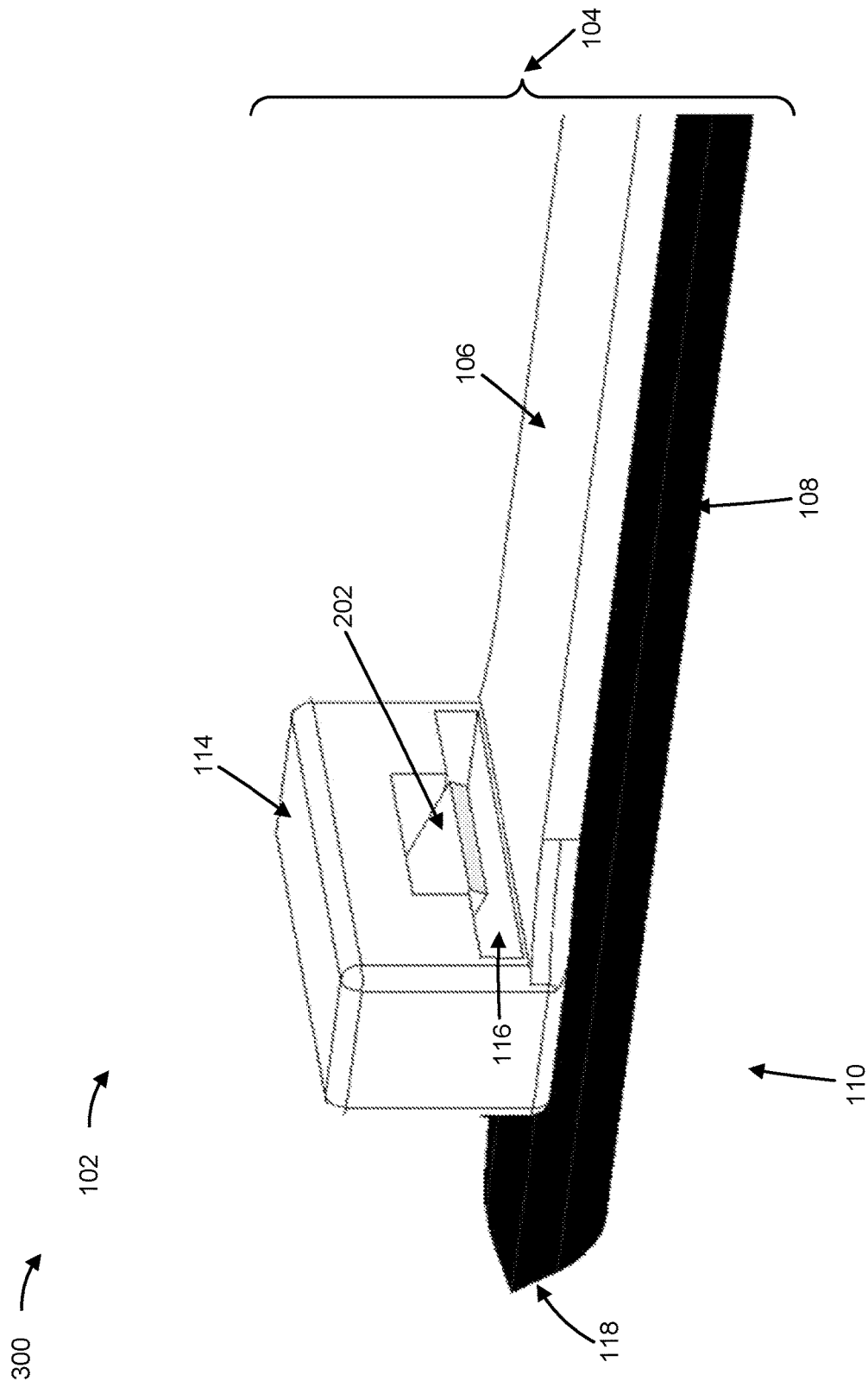
FIGS. 3A-3C are diagrams of an example implementation related to the locking mechanism of the adjustable seal.
Figure 3B:
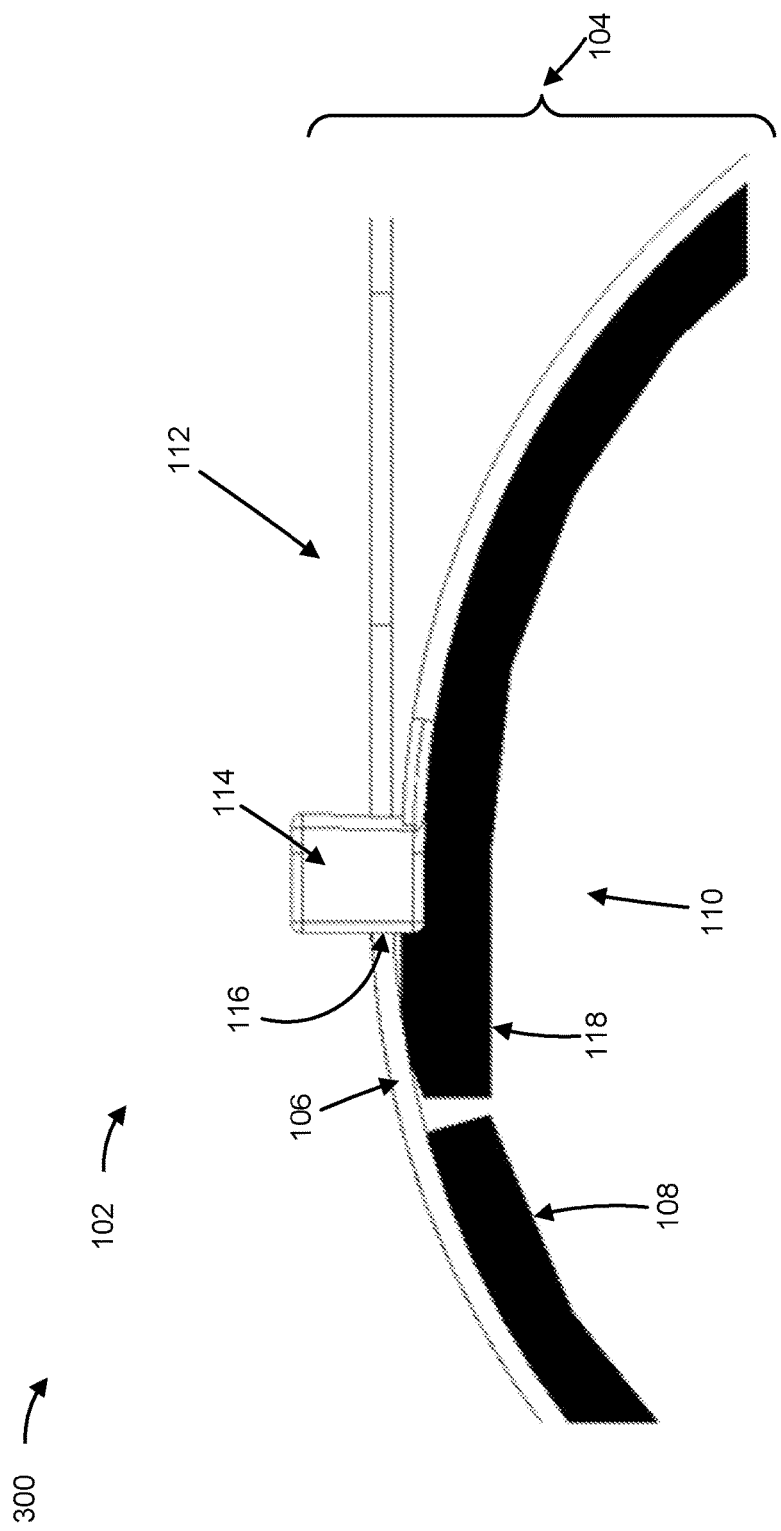
Figure 3C:
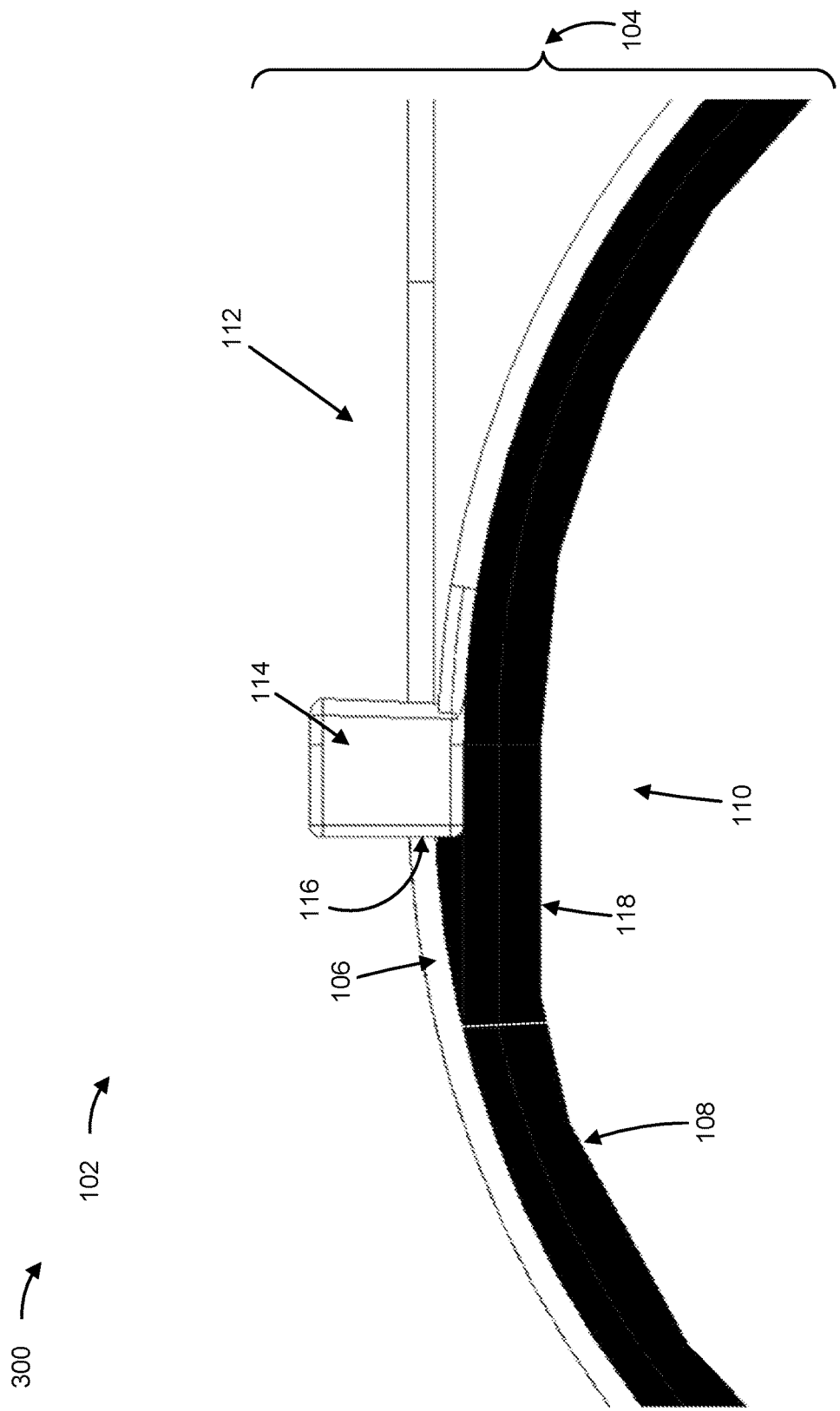

FIGS. 3A-3C are diagrams of an example implementation 300 related to the locking mechanism 114 of the adjustable seal 102 (e.g., at the first end 110 of the strap 104). FIG. 3A shows an angled side-view of the locking mechanism 114 at the first end 110 of the strap 104, FIG. 3B shows a side-view of the adjustable seal 102 in association with inserting the second end 112 through the opening 116 of the locking mechanism 114, and FIG. 3C shows a side-view of the adjustable seal 102 in association with the second end 112 inserted through the opening 116 of the locking mechanism 114 (e.g., in a final position).

In a similar manner as described above in relation to FIGS. 2A-2D, the opening 116 of the locking mechanism 114 may have a cross-section that matches a cross-section of the second end 112 of the strap 104. For example, as shown in FIGS. 3A-3C, when a portion of the second end 112 of the strap 104 (e.g., that is to insert through the opening 116 of the locking mechanism 114) includes the first layer 106 and does not include the second layer 108, the cross-section of the opening 116 may match a cross-section of the first layer 106. This may facilitate insertion of the first layer 106 of the second end 112 of the strap 104 as the second end 112 is inserted through the opening 116.

Further, as shown in FIGS. 3B-3C, this may allow an end of the second layer 108 (e.g., at a point associated with the second end 112 of the strap 104) to contact (e.g., in a flush manner) the lip 118, such as when the second end 112 of the strap 104 is inserted through the opening 116 of the locking mechanism 114 to form a loop (e.g., and when the loop formed by the strap 104 is sufficiently tightened). This may facilitate a sealing material (e.g., provided by the second layer 108 and/or the lip 118) being provided on an internal surface of the loop (e.g., on an entirety, or near entirety, of the internal surface of the loop), which may facilitate the strap 104 providing a seal.

In some implementations, a user of the adjustable seal 102 may cut off a portion of the second layer 108 (e.g., using a knife, such as box cutter) from the second end 112 of the strap 104. This may allow a length of the second layer 108 to be sized to provide a seal (e.g., when contacting the lip 118) of a particular diameter, width, or other dimension (e.g., when the second end 112 of the strap 104 is inserted through the opening 116 of the locking mechanism 114 to form a loop). In some implementations, the adjustable seal 102 may include an indicator that indicates a position along the second layer 108 at which a portion of the second layer 108 is to be removed (e.g., to allow the length of the second layer 108 to be properly sized). The indicator may be an indentation (e.g., an impression, a cut, a notch, a depression, a recess, or another type of indentation), an imprint (e.g., a printed feature comprising paint or ink, or another type of imprint), or another type of mark (e.g., on the surface of the second layer 108). Removal of the portion of the second layer 108 (e.g., as indicated by the indicator) may also facilitate insertion of the second end 112 of the strap 104 through the opening 116 of the locking mechanism 114 (e.g., to allow the strap 104 to form a loop). Additionally, or alternatively, the adjustable seal 102 may include an indicator that indicates at least one engagement component 120, of the one or more engagement components 120, with which the locking component 202 is to engage (e.g., to allow the loop to applying a sealing force when the second layer 108 is sized to provide a seal of a particular diameter, width, or other dimension). Accordingly, a user of the adjustable seal 102 may cause the second end 112 to insert through the opening 116 of the locking mechanism to allow the locking component 202 to engage the at least one engagement component 120 (e.g., to cause the loop to apply the sealing force).

As indicated above, FIGS. 3A-3C are provided as an example. Other examples may differ from what is described in connection with FIGS. 3A-3C.

Figure 4A:
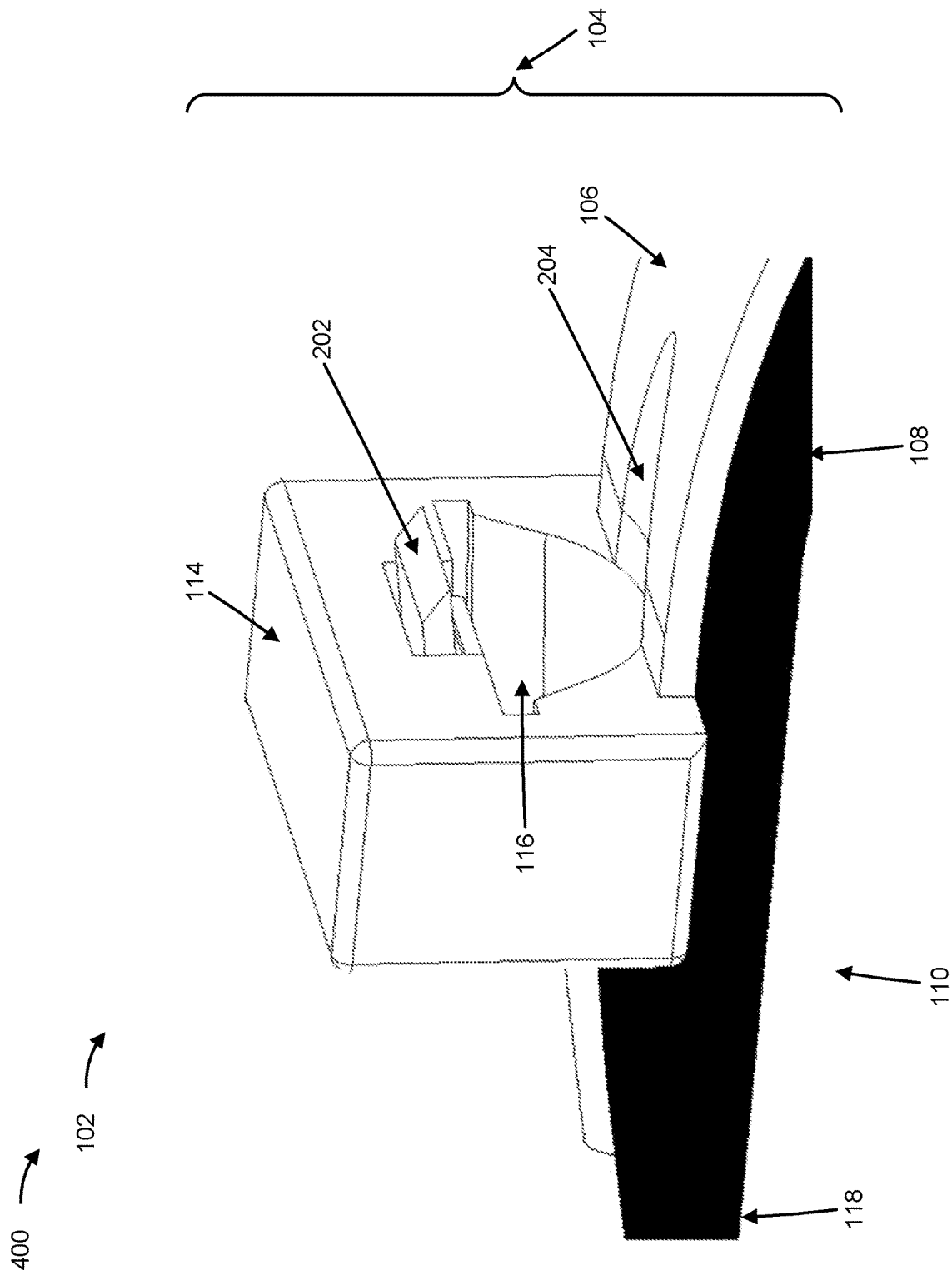
FIGS. 4A-4B are diagrams of an example implementation related to a locking component of the locking mechanism of the adjustable seal.
Figure 4B:
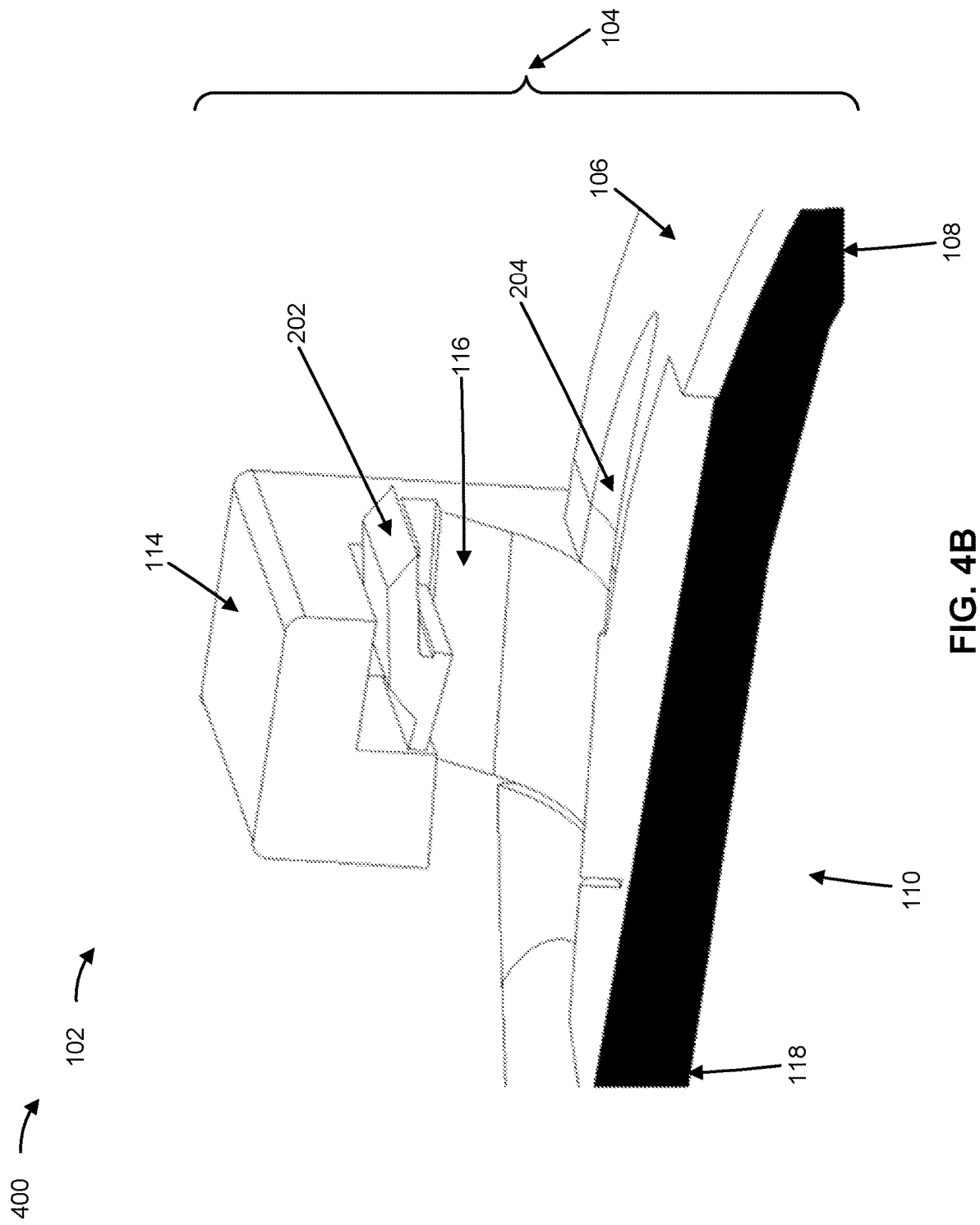

FIGS. 4A-4B are diagrams of an example implementation 400 related to the locking component 202 of the locking mechanism 114 of the adjustable seal 102 (e.g., at the first end 110 of the strap 104). FIG. 4A shows an angled side-view of the locking component 202 and the locking mechanism 114 at the first end 110 of the strap 104, and FIG. 4B shows an angled side-view of the locking component 202 and the locking mechanism 114 at the first end 110 of the strap 104 with a portion of the locking mechanism 114 cut away.

As shown in FIGS. 4A-4B, the locking component 202 may provide a disengagement functionality (e.g., to allow the locking component 202 to cease engaging with at least one engagement component 120). For example, a user of the adjustable seal 102 may push down on the locking component 202 (e.g., with a user's finger) to cause the locking component 202 to adjust from an engagement position to a disengagement position. This may cause the locking component 202 to cease engaging with the at least one engagement component 120, and therefore a position of the second end 112 of the strap 104 within the opening 116 of the locking mechanism 114 may be adjusted. This may allow a loop formed by the strap 104 to be loosened (e.g., to allow the strap 104 to be removed from an object, or to be repositioned on the object).

As indicated above, FIGS. 4A-4B are provided as an example. Other examples may differ from what is described in connection with FIGS. 4A-4B.

Figure 5A:
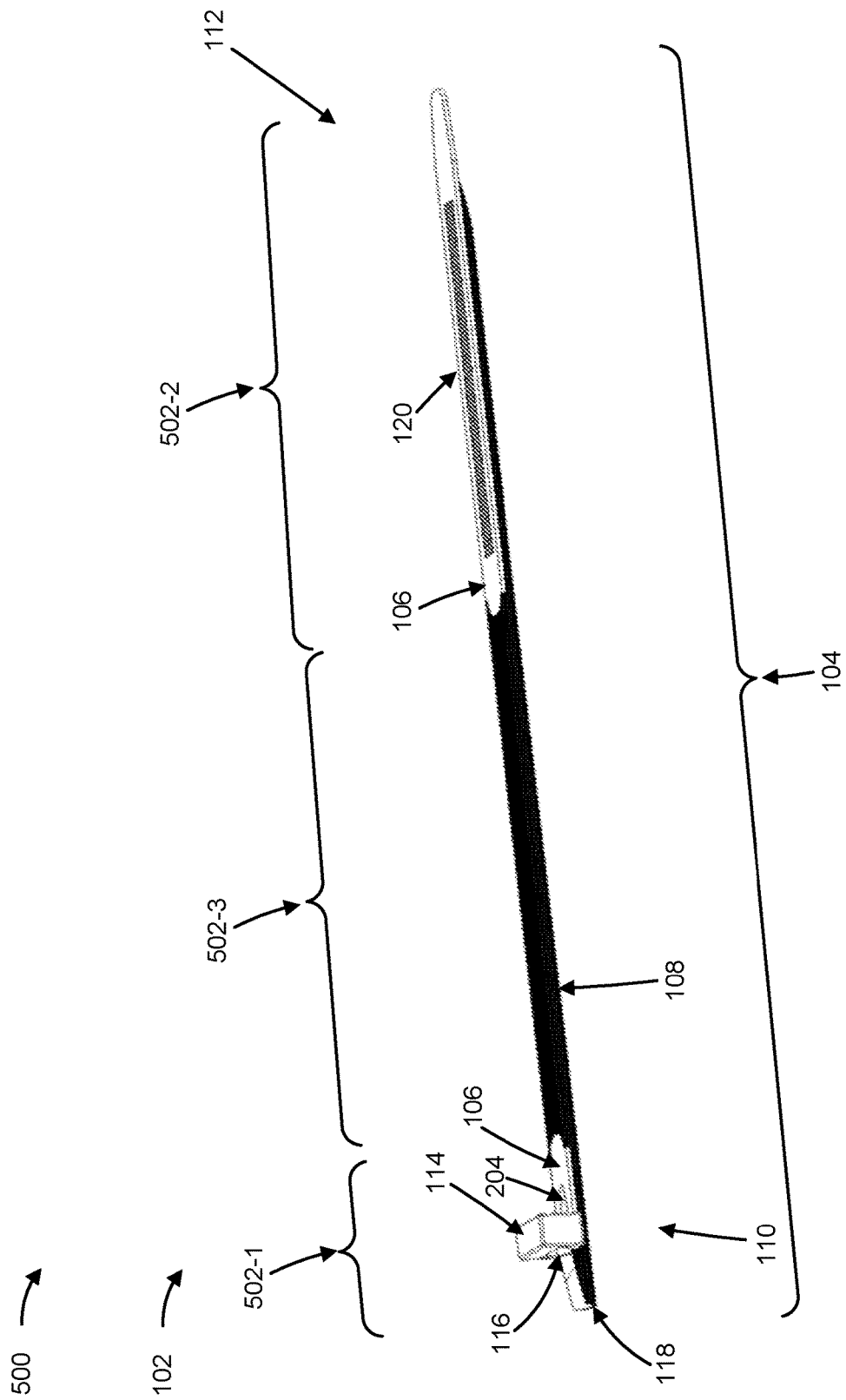
FIGS. 5A-5C are diagrams of an example implementation related to another configuration of the adjustable seal.
Figure 5B:
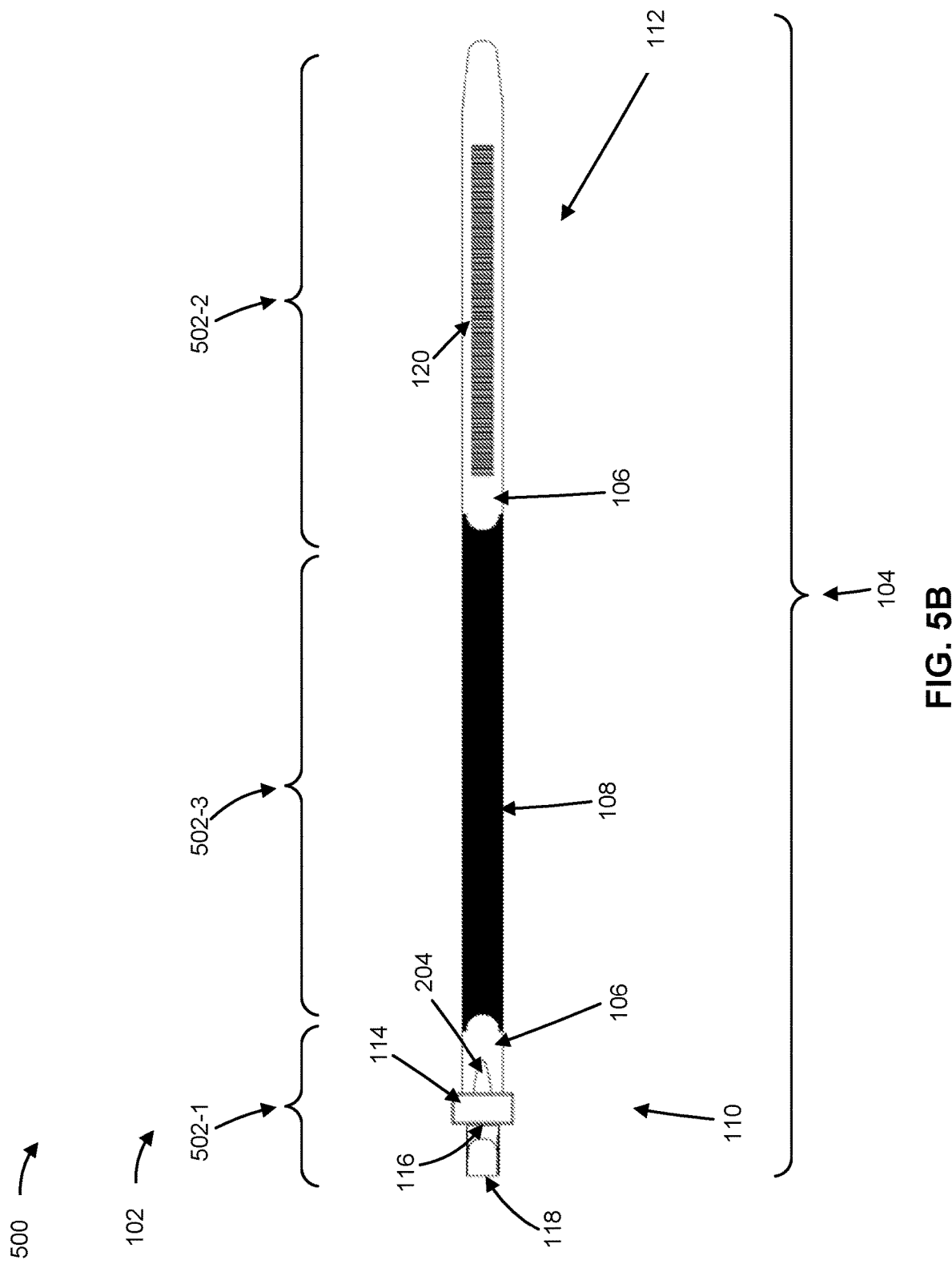
Figure 5C:
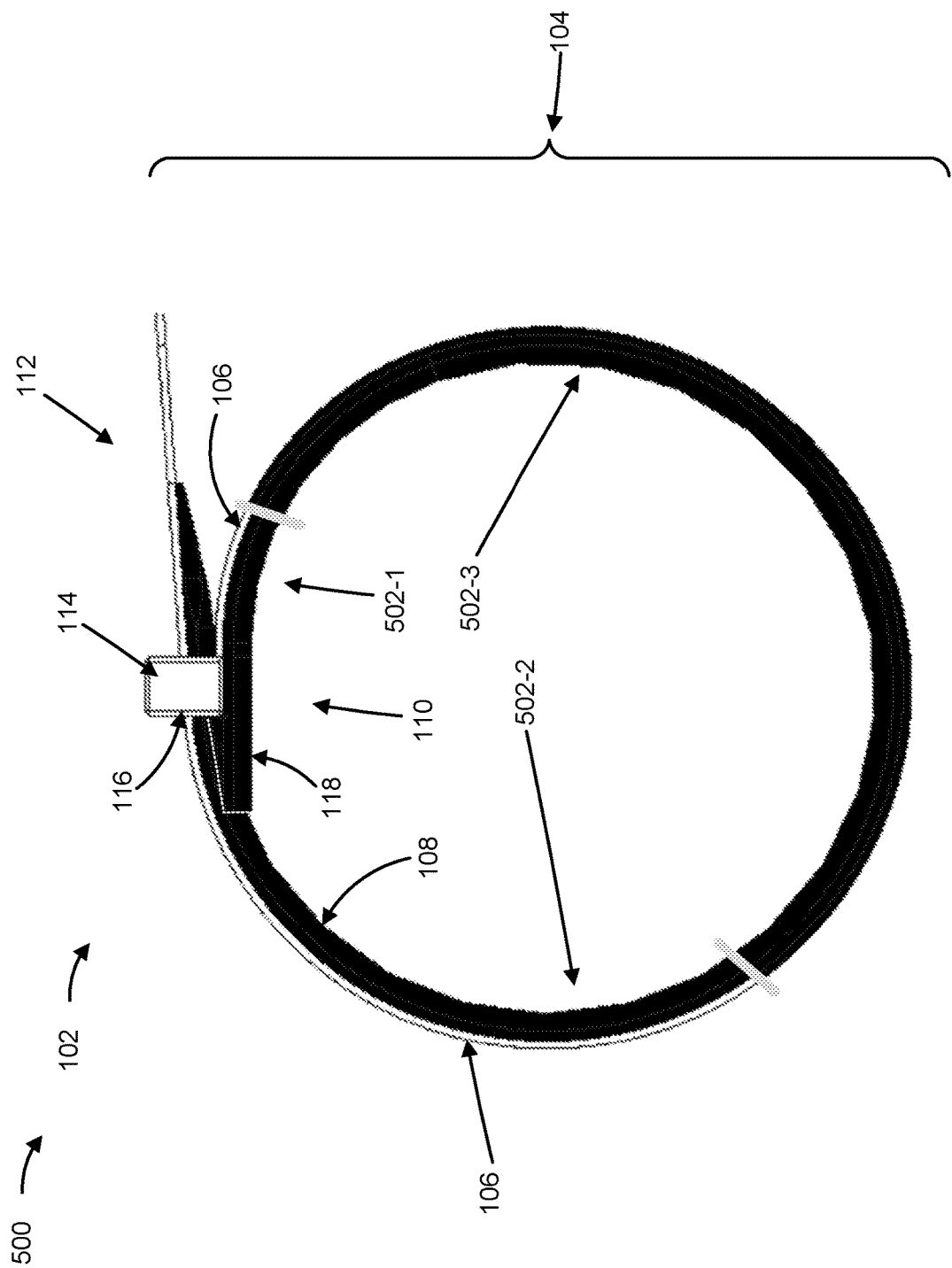

FIGS. 5A-5C are diagrams of an example implementation 500 related to another configuration of the adjustable seal 102. FIG. 5A shows an angled side-view of the adjustable seal 102, FIG. 5B shows a top-down view of the adjustable seal 102, and FIG. 5C shows an angled side-view of the adjustable seal 102 when it is formed into a loop.

In some implementations, the strap 104 may include multiple sections 502 along a length of the strap 104. For example, as shown in FIGS. 5A-5C, the strap may include a first section 502-1 (e.g., at the first end 110 of the strap 104), a second section 502-2 (e.g., at the second end 112 of the strap 104), and a third section 502-3 (e.g., that is disposed between the first section 502-1 and the second section 502-2 along the length of the strap 104). The first section 502-1 may include a first portion of the first layer 106 disposed on a first portion of the second layer 108, and the second section 502-2 may include a second portion of the first layer 106 disposed on a second portion of the second layer 108. Notably, the third section 502-3 may include a third portion of the second layer 108, upon which no portion of the first layer 106 is disposed (e.g., the third section 502-3 may include only the second layer 108). In this way, a "central" portion of the strap 104 may comprise just a sealing material, which may facilitate the strap 104 providing a seal when the second end 112 is inserted through the opening 116 of the locking mechanism 114 (e.g., because the sealing material may be more elastic that a non-elastic material and therefore may be more likely to allow the loop formed by the strap 104 to be sufficiently tightened to apply a sealing force on an object).

As indicated above, FIGS. 5A-5C are provided as an example. Other examples may differ from what is described in connection with FIGS. 5A-5C.

INDUSTRIAL APPLICABILITY

The disclosed adjustable seal (e.g., the adjustable seal 102) may be used in any application where an O-ring seal would otherwise be used. For example, the adjustable seal may be used to form a loop and thereby seal (as described herein) a joint between components of a machine. Accordingly, the adjustable seal can be used to replace a degraded, damaged, or broken O-ring seal of the joint without needing to dissemble and reassemble the components. For example, a user of the adjustable can wrap a strap of the adjustable seal around the joint, insert a second end of the strap into a locking mechanism at a first end of the strap to form a loop, and pull the second end of the strap to tighten the loop to cause the loop to form a seal around the joint. This reduces an amount of time that is needed to replace the O-ring seal and reduces a likelihood that the components will be damaged as a result of the replacement (e.g., because disassembly and reassembly of the components is not needed). Further, because replacing the O-ring seal with the adjustable seal is a straightforward process, a likelihood that the O-ring seal is replaced when needed is increased, which reduces a likelihood of damage to the components due to improper, or non-existent, sealing of the joint. This thereby improves a performance of the components and of the machine, and reduces an amount of maintenance that is required to service the components and the machine.

The adjustable seal is also more durable than an O-ring seal. For example, the adjustable seal, when formed in a loop to provide a seal, has an exterior layer that comprises a non-sealing material. This non-sealing material protects an interior layer that comprises a sealing material from normal, everyday wear-and-tear. For example, the exterior layer shields the interior layer from ultraviolet rays (e.g., from the sun) that would otherwise degrade the interior layer, and also protects the interior layer from debris, or other objects, that might otherwise contact and damage or break the interior layer. Accordingly, the adjustable seal provides an improved sealing performance, as compared to an O-ring seal, which further protects the components and machine. This thereby further improves a performance of the components of the machine, and further reduces an amount of maintenance that is required to service the components and the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:
1. An adjustable seal, comprising:
a multi-layer strap having a first end and a second end, wherein:
  a first layer of the multi-layer strap comprises a non-sealing material;
  a second layer of the multi-layer strap comprises a sealing material;
  the first end of the multi-layer strap includes a locking mechanism on the first layer of the multi-layer strap and a lip extending from an input side of an opening of the locking mechanism; and
  the second end of the multi-layer strap is configured to be inserted through the opening of the locking mechanism to cause the multi-layer strap to form a loop that is to provide a seal,
    wherein the lip is configured to contact a first portion of the second layer of the multi-layer strap when the second end of the multi-layer strap is inserted through the opening of the locking mechanism to cause the multi-layer strap to form the loop, and
    wherein the first layer of the multi-layer strap is to form an external layer of the loop and the second layer of the multi-layer strap is to form an internal layer of the loop.

2. The adjustable seal of claim 1, wherein the internal layer of the loop is configured to surround an object.

3. The adjustable seal of claim 1, wherein:
a portion of the first layer of the multi-layer strap includes one or more engagement components; and
the locking mechanism includes a locking component that is configured to engage with the one or more engagement components.

4. The adjustable seal of claim 3, wherein the locking mechanism is configured to prevent loosening of the loop when the second end of the multi-layer strap is inserted through the opening of the locking mechanism and the locking component is engaged with at least one engagement component of the one or more engagement components.

5. The adjustable seal of claim 1, wherein the lip comprises the sealing material.

6. The adjustable seal of claim 1, wherein:
a first section of the multi-layer strap includes a first portion of the first layer of the multi-layer strap disposed on the first portion of the second layer of the multi-layer strap;
a second section of the multi-layer strap includes a second portion of the first layer of the multi-layer strap disposed on a second portion of the second layer of the multi-layer strap; and
a third section of the multi-layer strap includes a third portion of the second layer of the multi-layer strap, upon which no portion of the first layer of the multi-layer strap is disposed,
wherein the third section is disposed between the first section and the second section along a length of the multi-layer strap.

7. The adjustable seal of claim 1, wherein the non-sealing material includes at least one of:
nylon,
polypropylene,
polyester,
or metal.

8. The adjustable seal of claim 1, wherein the sealing material includes at least one of:
natural rubber,
silicone rubber,
neoprene rubber,
nitrile rubber,
fluorocarbon rubber,
or polyurethane.

9. An adjustable seal, comprising:
a strap having a first end and a second end, wherein:
a first layer of the strap comprises a non-sealing material;
a second layer of the strap comprises a sealing material;
the first end of the strap includes a locking mechanism on the first layer of the strap and a lip on the first layer of the strap, wherein the lip extends from an input side of an opening of the locking mechanism; and
the second end of the strap is configured to be inserted through the opening of the locking mechanism to cause the strap to form a loop that is to provide a seal, wherein the lip is configured to contact a first portion of the second layer of the strap when the second end of the strap is inserted through the opening of the locking mechanism to cause the strap to form the loop.

10. The adjustable seal of claim 9, wherein the first layer of the strap is to form an external layer of the loop and the second layer of the strap is to form an internal layer of the loop.

11. The adjustable seal of claim 9, wherein the opening of the locking mechanism is aligned with the first layer of the strap at the opening of the locking mechanism.

12. The adjustable seal of claim 9, wherein:
a portion of the first layer of the strap includes one or more engagement components; and
the locking mechanism includes a locking component that is configured to engage with the one or more engagement components.

13. The adjustable seal of claim 12, wherein the first layer of the strap includes an indicator that indicates that the locking component is to engage with at least one engagement component of the one or more engagement components.

14. The adjustable seal of claim 9, wherein a cross-section of the second layer of the strap is at least one of:
circular,
oval,
rectangular, or
polygonal.

15. The adjustable seal of claim 9, wherein the second layer of the strap includes an indicator that indicates a position along the second layer of the strap at which a second portion of the second layer of the strap is to be removed to facilitate insertion of the second end of the strap through the opening of the locking mechanism to cause the strap to form the loop.

16. An adjustable seal, comprising:
a strap having a first end and a second end, wherein:
a first layer of the strap comprises a non-sealing material;
a second layer of the strap comprises a sealing material;
the first end of the strap includes a locking mechanism and a lip extending from an input side of an opening of the locking mechanism; and
wherein the lip is configured to contact a first portion of the second layer of the strap when the second end of the strap is inserted through the opening of the locking mechanism to cause the strap to form a loop.

17. The adjustable seal of claim 16, wherein the second layer of the strap forms an internal layer of the loop when the second end of the strap is inserted through the opening of the locking mechanism.

18. The adjustable seal of claim 16, wherein:
a portion of the first layer of the strap includes one or more engagement components; and
the locking mechanism includes a locking component that is configured to engage with the one or more engagement components.

19. The adjustable seal of claim 16, wherein the opening of the locking mechanism is aligned with the first layer of the strap at the opening of the locking mechanism.

20. The adjustable seal of claim 1, wherein the locking mechanism comprises a second non-sealing material that is a same or different material than the non-sealing material of the first layer of the multi-layer strap.

* * * * *